US011287562B2

(12) United States Patent
Robinson et al.

(10) Patent No.: US 11,287,562 B2
(45) Date of Patent: Mar. 29, 2022

(54) ILLUMINATION APPARATUS INCLUDING MASK WITH PLURALITY OF APERTURES AND DISPLAY APPARATUS COMPRISING SAME

(71) Applicant: ReaID Spark, LLC, Boulder, CO (US)

(72) Inventors: Michael G. Robinson, Boulder, CO (US); Graham J. Woodgate, Henley-on-Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 17/178,936

(22) Filed: Feb. 18, 2021

(65) Prior Publication Data

US 2021/0263209 A1     Aug. 26, 2021

Related U.S. Application Data

(60) Provisional application No. 62/979,020, filed on Feb. 20, 2020.

(51) Int. Cl.
*F21V 8/00*     (2006.01)
*G09F 9/33*     (2006.01)
(Continued)

(52) U.S. Cl.
CPC .......... *G02B 6/0055* (2013.01); *F21V 5/007* (2013.01); *F21V 7/0008* (2013.01);
(Continued)

(58) Field of Classification Search
CPC ...... F21V 5/007; F21V 7/0008; F21V 7/0083; F21V 11/08; F21V 11/12; F21V 11/14;
(Continued)

(56) References Cited

U.S. PATENT DOCUMENTS

| 5,184,114 A | 2/1993 | Brown |
| 5,812,105 A | 9/1998 | Ven |

(Continued)

FOREIGN PATENT DOCUMENTS

| CN | 102859268 A | 1/2013 |
| CN | 103117348 A | 5/2013 |

(Continued)

OTHER PUBLICATIONS

International search report and written opinion of international searching authority for PCT application PCT/US2021/018544 dated Apr. 29, 2021.

(Continued)

*Primary Examiner* — Keith G. Delahoussaye
(74) *Attorney, Agent, or Firm* — Penny L. Lowry

(57) ABSTRACT

An illumination apparatus comprises a first substrate, an optical structure, an array of light emitting elements disposed on the first substrate and between the first substrate and the optical structure, and a mask comprising a plurality of apertures therein. The optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask.

23 Claims, 9 Drawing Sheets

(51) Int. Cl.
*G02B 19/00* (2006.01)
*F21V 5/00* (2018.01)
*F21V 7/00* (2006.01)
*F21V 13/04* (2006.01)
*F21V 11/12* (2006.01)

(52) U.S. Cl.
CPC ............ *F21V 7/0083* (2013.01); *F21V 11/12* (2013.01); *F21V 13/04* (2013.01); *G02B 6/0035* (2013.01); *G02B 6/0073* (2013.01); *G02B 19/0028* (2013.01); *G02B 19/0047* (2013.01); *G02B 19/0066* (2013.01); *G09F 9/33* (2013.01)

(58) Field of Classification Search
CPC ..... F21V 13/04; G02B 6/0035; G02B 6/0055; G02B 19/0028; G02B 19/0047; G02B 19/0066
See application file for complete search history.

(56) References Cited

U.S. PATENT DOCUMENTS

| | | | |
|---|---|---|---|
| 6,547,423 B2 | 4/2003 | Marshall et al. | |
| 6,570,324 B1 | 5/2003 | Tutt et al. | |
| 7,014,964 B1 | 3/2006 | Hsu et al. | |
| 7,171,874 B1 | 2/2007 | Huang | |
| 7,863,614 B2 | 1/2011 | Toyama et al. | |
| 7,994,531 B2 | 8/2011 | Lin et al. | |
| 9,519,153 B2 | 12/2016 | Robinson et al. | |
| 10,121,772 B1 | 11/2018 | Wu et al. | |
| 10,126,575 B1 | 11/2018 | Robinson et al. | |
| 10,303,030 B2 | 5/2019 | Robinson et al. | |
| 10,533,730 B2 | 1/2020 | Harrold et al. | |
| 2004/0080938 A1* | 4/2004 | Holman ............ G02F 1/133605 362/231 |
| 2004/0089935 A1 | 5/2004 | Lehner | |
| 2004/0126911 A1 | 7/2004 | Kimura | |
| 2004/0161871 A1 | 8/2004 | Omori | |
| 2004/0218390 A1 | 11/2004 | Holman et al. | |
| 2004/0239243 A1 | 12/2004 | Roberts et al. | |
| 2004/0263061 A1 | 12/2004 | Ishikawa et al. | |
| 2005/0111100 A1 | 5/2005 | Mather et al. | |
| 2005/0219693 A1 | 10/2005 | Hartkop et al. | |
| 2006/0152931 A1 | 7/2006 | Holman | |
| 2006/0256255 A1 | 11/2006 | Minami | |
| 2006/0290276 A1 | 12/2006 | Cok et al. | |
| 2007/0007237 A1 | 1/2007 | Wu et al. | |
| 2007/0019131 A1 | 1/2007 | Choi et al. | |
| 2007/0047254 A1 | 3/2007 | Schardt et al. | |
| 2007/0116424 A1 | 5/2007 | Ting et al. | |
| 2007/0165394 A1 | 7/2007 | Chang | |
| 2007/0176195 A1 | 8/2007 | Kuiseko et al. | |
| 2007/0242477 A1 | 10/2007 | Yoo et al. | |
| 2007/0256453 A1 | 11/2007 | Barnes et al. | |
| 2008/0043466 A1 | 2/2008 | Chakmakjian et al. | |
| 2008/0089093 A1 | 4/2008 | Miller et al. | |
| 2008/0123350 A1 | 5/2008 | Choe et al. | |
| 2008/0225523 A1 | 9/2008 | Samber et al. | |
| 2008/0237612 A1 | 10/2008 | Cok | |
| 2008/0258162 A1 | 10/2008 | Koung et al. | |
| 2008/0315755 A1 | 12/2008 | Han | |
| 2009/0001869 A1 | 1/2009 | Tanimoto et al. | |
| 2009/0086508 A1 | 4/2009 | Bierhuizen | |
| 2009/0109656 A1 | 4/2009 | Chang | |
| 2009/0128735 A1 | 5/2009 | Larson et al. | |
| 2009/0242929 A1 | 10/2009 | Lin | |
| 2009/0268428 A1 | 10/2009 | Tsukada | |
| 2009/0296389 A1 | 12/2009 | Hsu | |
| 2010/0061096 A1* | 3/2010 | Sato ................... G02B 6/0043 362/235 |
| 2010/0097809 A1 | 4/2010 | Munro et al. | |
| 2010/0165635 A1 | 7/2010 | Chen et al. | |
| 2010/0171215 A1 | 7/2010 | Fischer et al. | |
| 2010/0172152 A1 | 7/2010 | Boonekamp | |
| 2010/0195330 A1 | 8/2010 | Schaefer et al. | |
| 2010/0258543 A1 | 10/2010 | Mizuno et al. | |
| 2010/0295762 A1 | 11/2010 | Yeom et al. | |
| 2010/0317132 A1 | 12/2010 | Rogers et al. | |
| 2011/0003410 A1 | 1/2011 | Tsay et al. | |
| 2011/0018860 A1 | 1/2011 | Parry-Jones et al. | |
| 2011/0038150 A1 | 2/2011 | Woodgate et al. | |
| 2011/0090672 A1 | 4/2011 | Zhu et al. | |
| 2011/0151602 A1 | 6/2011 | Speier | |
| 2011/0194034 A1 | 8/2011 | Shimizu | |
| 2011/0255303 A1 | 10/2011 | Nichol et al. | |
| 2012/0086875 A1 | 4/2012 | Yokota | |
| 2012/0119237 A1 | 5/2012 | Leatherdale et al. | |
| 2012/0140462 A1 | 6/2012 | Pickard | |
| 2012/0147296 A1 | 6/2012 | Montgomery et al. | |
| 2012/0258963 A1 | 10/2012 | Berger et al. | |
| 2012/0320627 A1* | 12/2012 | Araki .................... F21V 21/005 362/608 |
| 2013/0033849 A1 | 2/2013 | Roberts et al. | |
| 2013/0039062 A1 | 2/2013 | Vinther et al. | |
| 2013/0107525 A1 | 5/2013 | Woodgate et al. | |
| 2013/0121000 A1 | 5/2013 | Lee et al. | |
| 2013/0258663 A1 | 10/2013 | Woodgate et al. | |
| 2013/0293793 A1 | 11/2013 | Lu | |
| 2014/0022619 A1 | 1/2014 | Woodgate et al. | |
| 2014/0098418 A1 | 4/2014 | Lin | |
| 2014/0140654 A1 | 5/2014 | Brown et al. | |
| 2014/0186979 A1 | 7/2014 | Tu et al. | |
| 2014/0211462 A1 | 7/2014 | Keller et al. | |
| 2014/0211503 A1 | 7/2014 | Tarsa | |
| 2014/0240828 A1* | 8/2014 | Robinson ............ G02B 6/0056 359/465 |
| 2014/0240839 A1 | 8/2014 | Yang et al. | |
| 2014/0316742 A1 | 10/2014 | Sun et al. | |
| 2015/0054011 A1 | 2/2015 | Koizumi et al. | |
| 2015/0062490 A1 | 3/2015 | Kwon | |
| 2015/0160396 A1 | 6/2015 | Wilcox et al. | |
| 2015/0268479 A1 | 9/2015 | Woodgate et al. | |
| 2015/0268513 A1 | 9/2015 | Chang et al. | |
| 2015/0295154 A1 | 10/2015 | Tu et al. | |
| 2015/0308635 A1 | 10/2015 | Li et al. | |
| 2016/0018077 A1 | 1/2016 | Mallory et al. | |
| 2016/0211413 A1 | 7/2016 | Park et al. | |
| 2016/0299281 A1 | 10/2016 | Robinson et al. | |
| 2017/0031085 A1 | 2/2017 | Lim et al. | |
| 2017/0045666 A1 | 2/2017 | Vasylyev | |
| 2017/0059127 A1 | 3/2017 | Jansma et al. | |
| 2017/0102127 A1 | 4/2017 | Woodgate et al. | |
| 2017/0139114 A1 | 5/2017 | Woodgate et al. | |
| 2017/0154919 A1 | 6/2017 | Chen et al. | |
| 2017/0161179 A1 | 6/2017 | Maple et al. | |
| 2017/0205959 A1 | 7/2017 | Seong | |
| 2017/0248289 A1 | 8/2017 | Vasylyev | |
| 2017/0261179 A1 | 9/2017 | Wu et al. | |
| 2018/0014007 A1 | 1/2018 | Brown | |
| 2018/0226384 A1 | 8/2018 | Park et al. | |
| 2018/0321553 A1 | 11/2018 | Robinson et al. | |
| 2019/0086706 A1 | 3/2019 | Robinson et al. | |
| 2019/0139243 A1 | 5/2019 | You et al. | |
| 2019/0220121 A1 | 7/2019 | Kim et al. | |
| 2019/0250458 A1 | 8/2019 | Robinson et al. | |
| 2019/0265478 A1 | 8/2019 | Cok et al. | |
| 2019/0278135 A1 | 9/2019 | Woodgate et al. | |
| 2019/0294004 A1 | 9/2019 | Hashimoto | |
| 2019/0377067 A1 | 12/2019 | Han et al. | |
| 2020/0049876 A1 | 2/2020 | Watanabe et al. | |
| 2020/0159055 A1 | 5/2020 | Robinson et al. | |
| 2020/0166783 A1 | 5/2020 | Roy et al. | |
| 2020/0259307 A1 | 8/2020 | Sharma et al. | |
| 2020/0321553 A1 | 10/2020 | Kwon et al. | |
| 2020/0355896 A1 | 11/2020 | Woodgate et al. | |

FOREIGN PATENT DOCUMENTS

| | | |
|---|---|---|
| CN | 105556374 A | 5/2016 |
| CN | 105849595 A | 8/2016 |
| DE | 102010031945 A1 | 1/2012 |
| EP | 1387412 A1 | 2/2004 |
| EP | 1835550 A2 | 9/2007 |

(56) References Cited

FOREIGN PATENT DOCUMENTS

| | | | |
|---|---|---|---|
| EP | 1890343 | A1 | 2/2008 |
| EP | 1986023 | A1 | 10/2008 |
| EP | 2182783 | A2 | 5/2010 |
| EP | 2595295 | A1 | 5/2013 |
| GB | 2464102 | A | 4/2010 |
| GB | 2484711 | A | 4/2012 |
| JP | 2000323755 | A | 11/2000 |
| JP | 2007294411 | A | 11/2007 |
| JP | 2009295309 | A | 12/2009 |
| JP | 2010238846 | A | 10/2010 |
| JP | 2013219397 | A | 10/2013 |
| WO | 2006115313 | A1 | 11/2006 |
| WO | 2007074932 | A1 | 7/2007 |
| WO | 2010038025 | A2 | 4/2010 |
| WO | 2010038025 | A3 | 6/2010 |
| WO | 2011131200 | A1 | 10/2011 |
| WO | 2012052722 | A2 | 4/2012 |
| WO | 2012052723 | A1 | 4/2012 |
| WO | 2013064801 | A1 | 5/2013 |
| WO | 2013112435 | A1 | 8/2013 |
| WO | 2014043384 | A1 | 3/2014 |
| WO | 2015089517 | A1 | 6/2015 |
| WO | 2017007770 | A2 | 1/2017 |
| WO | 2018185475 | A1 | 10/2018 |
| WO | 2018185476 | A1 | 10/2018 |
| WO | 2018208618 | A1 | 11/2018 |
| WO | 2019067846 | A1 | 4/2019 |
| WO | 2019107826 | A1 | 6/2019 |

OTHER PUBLICATIONS

EP18200530.6—European Search Report of the European Patent Office dated May 23, 2019.
International search report and written opinion of international searching authority for PCT application PCT/GB2018/050893 dated Aug. 27, 2018.
International search report and written opinion of international searching authority for PCT application PCT/GB2018/050894 dated Aug. 27, 2018.
International search report and written opinion of international searching authority for PCT application PCT/GB2019/050076 dated May 9, 2019.
International search report and written opinion of international searching authority for PCT application PCT/US2019/021570 dated May 24, 2019.
International search report and written opinion of international searching authority for PCT application PCT/US2019/031526 dated Jul. 29, 2019.
International search report and written opinion of international searching authority for PCT application PCT/US2020/040686 dated Nov. 20, 2020.
International search report and written opinion of international searching authority for PCT application PCT/US2020/047383 dated Dec. 4, 2020.
International search report and written opinion of international searching authority for PCT application PCT/US2020/050460 dated Dec. 8, 2020.
International search report and written opinion of international searching authority for PCT application PCT/US2020/050527 dated Feb. 3, 2021.
International search report and written opinion of international searching authority for PCT application PCT/US2020/053825 dated Dec. 30, 2020.
International search report and written opinion of international searching authority for PCT application PCT/US2020/053864 dated Dec. 14, 2020.
CN201880036805.8 Notification of the First Office Action dated Jul. 23, 2021.
CN201880036842.9 Notification of the First Office Action dated Jul. 23, 2021.
CN201980016364.X Notification of the First Office Action dated Dec. 27, 2021.
EP19804311.9—Extended European Search Report of the European Patent Office dated Dec. 15, 2021.

* cited by examiner

ILLUMINATION APPARATUS INCLUDING MASK WITH PLURALITY OF APERTURES AND DISPLAY APPARATUS COMPRISING SAME

TECHNICAL FIELD

The present disclosure relates to illumination apparatuses and display apparatuses.

BACKGROUND

Illumination apparatuses in which micro-LEDs are used, e.g. for displays such as laptop or TV displays, are becoming increasingly commercially relevant. In addition, displays with privacy functions are desirable to prevent content being shown on the screens of displays from being seen by unwanted people.

BRIEF SUMMARY

According to a first aspect of the present disclosure, there is provided an illumination apparatus, comprising a first substrate, an optical structure, an array of light emitting elements disposed on the first substrate and between the first substrate and the optical structure, and a mask comprising a plurality of apertures therein, wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask.

Advantageously an illumination apparatus may be provided with high output efficiency. Low reflectivity of the illumination apparatus to ambient illumination may be achieved. Low cross talk may be provided between different the apertures. A thin structure may be achieved that may be flexible and have free form shapes. Non-Lambertian output illumination may be provided to achieve increased on-axis efficiency. The display may be incorporated with a mask that matches the texture and appearance of the décor, for example in automotive interiors. When the display is unused it may be hidden to users.

The optical structure may comprise a plurality of curved reflectors configured to reflect at least some of the light emitted by the light emitting elements back past the light emitting elements towards the mask. The array of light emitting elements may be disposed between the optical structure and the mask. Achromatic imaging of the light emitting element to the aperture may be provided. High optical power may be provided in thin packages and total thickness may advantageously be reduced.

Each aperture may be aligned with a respective light emitting element. Advantageously light may be efficiently directed into each aperture from the respective aligned light emitting element.

The optical structure may comprise a plurality of waveguides configured to guide light emitted by the light emitting elements towards the mask, a first reflector configured to reflect at least some of the light guided by the waveguides towards the first substrate, and a second reflector configured to reflect at least some of the light reflected by the first reflector back towards the mask. Each waveguide may be aligned with a respective light emitting element. Each waveguide may comprise a cylindrical structure, and for each waveguide: the cylindrical structure may comprise an open end and a closed end opposite to the open end, and the cylindrical structure may be connected to the second reflector at the open end. Each waveguide may comprise a conical frustum structure and an annular wall extending around the conical frustum structure, and for each waveguide: the conical frustum structure may be connected to the second reflector via the annular wall.

The optical structure may be disposed between the array of light emitting elements and the mask. Advantageously the light emitting elements may be arranged on an opaque substrate. The area of opaque electronic components between the light emitting elements may be increased. Increased complexity of driving of the light emitting elements may be achieved.

One or more of the apertures of the mask may comprise a light diffuser disposed therein. Advantageously the cone angle of the light output may be increased. The far field illumination profile may have increased solid angle. The illumination apparatus may be visible from a wider range of viewing angles. The uniformity of the illumination apparatus may be increased.

One or more of the apertures of the mask may be circular. One or more of the apertures of the mask may be annular. Advantageously a mask suitable for use with an opaque substrate may be provided. Increased complexity of electrical driving of the light emitting elements may be achieved.

At least one of the light emitting elements may comprise a first light source and a separate second light source, wherein the first and second light sources are separately controllable. Advantageously at least two different angular profiles may be provided from the illumination apparatus.

The illumination apparatus may further comprise a controller configured to control the first and second light sources to switch between a first state in which the first light source is on and the second light source is off, and a second state in which the first light source is off and the second light source is on. The first light source may be configured to provide light with a first cone angle and the second light source is configured to provide light with a second cone angle, wherein the first cone angle is greater than the second cone angle. A switchable cone angle ambient illuminance may be provided.

The illumination apparatus may further comprise an array of passive optical nanostructures, each passive optical nanostructure being disposed on a respective one of the light emitting elements, and each passive optical nanostructure comprising an air gap disposed between its respective light emitting element and the optical structure. The first substrate and the optical structure may be bonded to advantageously achieve increased mechanical and thermal stability.

The light emitting elements may be micro-LEDs. Advantageously high resolution illumination apparatus may be achieved in a thin structure.

According to a second aspect of the disclosure, there is provided a display apparatus comprising the illumination apparatus of the first aspect. Advantageously high image contrast may be achieved in high ambient illumination. For a given illuminance, display brightness may be reduced to achieve desirable contrast such that power consumption is reduced. The display apparatus may have high resolution, high efficiency and may comprise high density addressing electronics that are not visible to the display user. Multiple displays may be arranged behind a mask to achieve seamless stitching over large areas. The display may be flexible and may have free form shapes.

The display apparatus may be a privacy display apparatus. In privacy mode of operation increased image security for off-axis snoopers may be achieved. In a share mode of operation, increased luminance and increased display uniformity for off-axis users may be achieved.

DETAILED DESCRIPTION

Figure 1:
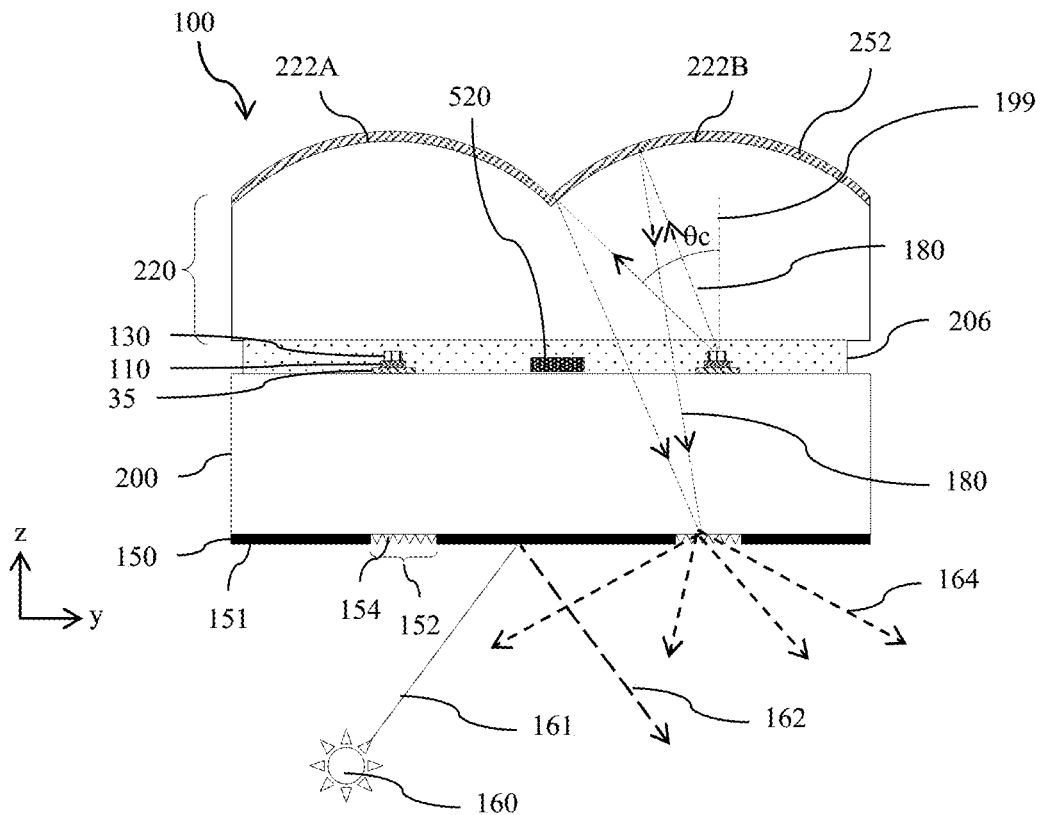
FIG. 1 and FIG. 2 respectively illustrate cross-sectional and perspective views of an embodiment of an illumination apparatus.

In this specification, (except when qualified by the term "packaged"), "LED" or "micro-LED" refers to an unpackaged LED die chip extracted directly from a monolithic wafer, i.e. a semiconductor element. Micro-LEDs may be formed by array extraction methods in which multiple LEDs are removed from a monolithic epitaxial wafer in parallel and may be arranged with positional tolerances that are less than 5 micrometres. This is different from packaged LEDs. Packaged LEDs typically have a lead-frame and plastic or ceramic package with solder terminals suitable for standard surface-mount PCB (printed circuit board) assembly. The size of the packaged LEDs and limits of PCB assembly techniques means that displays formed from packaged LEDs are difficult to assemble with pixel pitches below about 1 mm. The accuracy of components placed by such assembly machines is typically about plus or minus 30 micrometres. Such sizes and tolerances prevent application to very high-resolution displays.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

Figure 2:
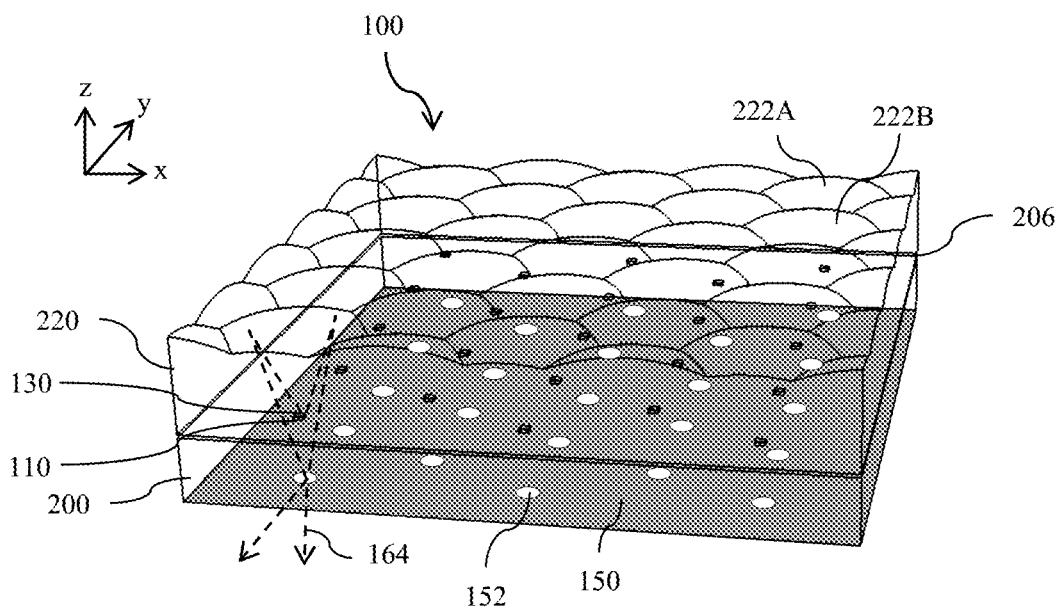

FIG. 1 and FIG. 2 respectively illustrate cross-sectional and perspective views of an embodiment of an illumination apparatus 100. The illumination apparatus 100 comprises an array of light emitting elements 110, an array of reflective masks 35, a substrate 200, an array of passive optical nanostructures 130, an optical structure 220, an output mask 150 comprising an array of light transmitting apertures 152, an adhesive layer 206, and electronics 520.

The array of light emitting elements 110 is disposed on the substrate 200 that is for example a glass or polymer substrate. Each light reflecting element 110 has a reflective mask 35 arranged between the light emitting element and the substrate 200. The reflective mask 35 is arranged to recirculate light that is passing from the light emitting element 110 towards the substrate 200 and redirect the light towards the optical structure 220. Advantageously light from the light emitting element 110 is efficiently directed towards the apertures 152 as will be described below.

The light emitting elements 110 are further arranged between the optical structure 220 and the output mask 150. The light emitting elements 110 are micro-LEDs (i.e. LEDS with a maximum dimension or size of less than 300 micrometres, preferably less than 200 micrometres and more preferably less than 100 micrometres).

In this embodiment, the light emitting elements 110 are uniformly distributed on the substrate 200 in the x and y directions, as shown in FIG. 1 and FIG. 2. The light emitting elements may be arranged in a hexagonal arrangement as illustrated, in a square grid, a rectangular grid arrangements, in stripe arrangements or in other packing arrangements.

The light emitting elements 110 may be arranged to provide white light output, or may produce separate colour output such as red, green and blue, yellow, white and other know colour pixel arrangements. Advantageously an addressable colour display function may be provided.

Each passive optical nanostructure 130 of the array of passive optical nanostructures 130 is disposed on a respective one of the light emitting elements 110 and arranged to receive light from the respective aligned light emitting element 100.

The optical structure 220 is a reflective optical structure configured to reflect at least some of the light it receives back towards the substrate 200. The optical structure 220 comprises a plurality of concave curved reflectors 222A, 222B, each aligned with a respective light emitting element 110 and configured to reflect at least some of the light received from that light emitting element 110. The curved reflectors 222A, 222B comprise a reflective material 252 arranged on a curved surface of the respective optical structure. Thus the optical structure 252 comprises the reflective material 252. In other figures below in which the reflective material 252 of the optical structure 220 is not illustrated, said curved reflectors 222A, 222B may be considered as comprising a reflective surface such as provided by a reflective coating 252.

Specifically, the centre of each curved reflector 222A is aligned with a respective light emitting element 110. The optical structure 220 may be formed from a transparent main body and a reflective material disposed thereon constituting the curved reflectors 222A, 222B. The body of the optical structure 220 may be a glass or polymer material. The surface relief structure of the curved reflectors may be provided by a moulding or casting process material in a polymer material for example. The reflective layer 252 formed on the curved reflectors 222A, 222B, may comprise for example a deposited metal coating that may comprise silver or aluminium materials as well as surface adhesion promoters and protective layers.

The output mask 150 is disposed on an opposite side of the substrate 200 to the array of light emitting elements 110, and comprises a plurality of apertures 152 therein and opaque region 151. The output mask 150 opaque region 151 may be formed from any appropriate opaque material, for example by printing a black material onto the substrate 200. The opaque region 151 may alternatively or additionally comprise a nanostructured black absorber, a "nanoblack" or other similar material such as that marketed by Acktar, (Kiryat-Gat, Israel). Advantageously very low reflectivity may be achieved from the front of the illumination apparatus.

The output mask 150 is configured to block light from passing therethrough, except for through its apertures 152. Each of the apertures 152 of the output mask 150 comprises a diffuser 156 disposed therein, the diffusers 156 being configured to scatter light that travels through the apertures 152.

The adhesive layer 206 adheres the optical structure 220 to the substrate 200, and fills the space between the optical structure 220 and the substrate 200 around the light emitting elements 110 and passive optical nanostructure 130.

In operation, the optical structure 220 is configured to receive light emitted by the array of light emitting elements 110, direct the received light into a direction away from the substrate 200, direct at least some of the light which has been directed away from the substrate 200 back towards the substrate 200, and direct at least some of the light which has been directed back towards the substrate 200 through the plurality of apertures 152 of the output mask 150. For example, as shown in FIG. 1, in sequence, a light ray 180 emitted by a light emitting element 110 travels through the passive optical nanostructure 130 on that light emitting element 110, travels through the adhesive layer 206, enters the optical structure 220, travels within the optical structure 220 to a curved reflector 222A, is reflected by the curved reflector 222A back towards the substrate 200, travels within the optical structure 220 back to the adhesive layer 206, travels through the adhesive layer 206, travels through the substrate 200, and travels through an aperture 152. In this way, the optical structure 220 focuses the light that it receives towards the apertures 152 within the output mask 150, as will be explained in more detail below.

The diffusers 156 are configured to scatter light that travels through the apertures 152 to provide output light rays 164. The diffuser in the aperture 152 provides rays 164 that may have a wide angular spread. Advantageously the illumination apparatus may provide illumination over wide illumination angles and in display applications the illumination apparatus may be visible from wide viewing angles.

The electronics 520 is disposed on the substrate 500 between adjacent light emitting elements 110 in the x direction, and is for driving one or more of the light emitting elements 110. Advantageously the present embodiments achieve hiding of the electronics 520 from an observer of the illumination apparatus. The electronics are arranged in the region under the cusps of the curved reflective elements such that light rays are not incident on the electronics, and loss is minimised. Addressing electronics may be provided near to the light emitting elements 110 for advantageously achieving efficient driving and control.

Figure 3A:
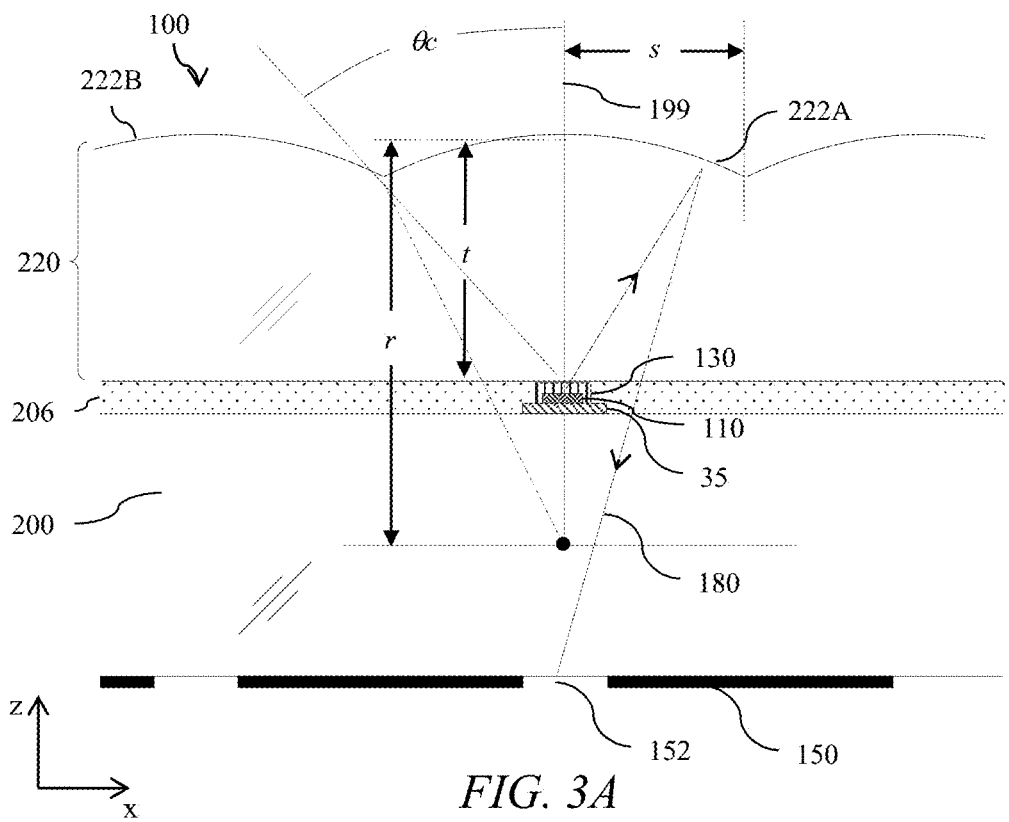
FIG. 3A illustrates a cross-sectional view of an illumination apparatus showing how an optical structure manipulates light that it receives in a structure comprising passive optical nanostructures.

FIG. 3A illustrates a cross-sectional view of the illumination apparatus 100 showing how the optical structure 220 manipulates light that it receives. Features of the embodiment of FIG. 3A not discussed in further detail may be assumed to correspond to the features with equivalent reference numerals as discussed above, including any potential variations in the features.

As shown, the way each curved reflector 222A of the optical structure 220 reflects light is based on various parameters of the curved reflector 222A. Said parameters include, for example, the refractive index of the optical structure 220, the radius r of curvature of the curved reflector 222A, a distance t in the z direction between the centre of the curved reflector 222A and the light emitting element 110, and a distance s in the x direction between the centre and the edge of the curved reflector 222A. As will be described further below, the light output from the light emitting element and passed by the passive optical nanostructure 130 is within an angle θc of the optical axis 199 that is normal to the input surface 221 of the optical structure 220. Advantageously light rays do not pass from a light emitting element to adjacent curved reflector 222B.

These parameters are set such that each curved reflector 222A directs substantially all the light that it reflects towards the aperture 150 that it is aligned with. This helps to focus the light emitted by the light emitting elements 110 towards the apertures 152.

Figure 3B:
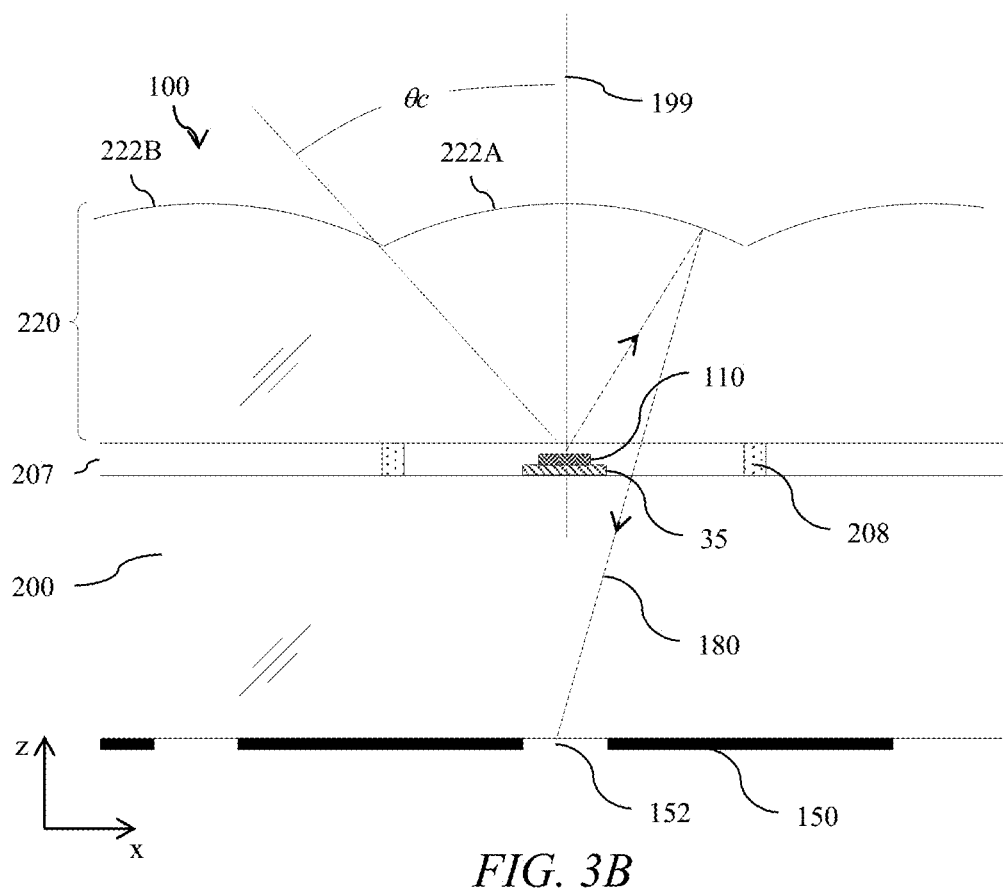
FIG. 3B illustrates a cross-sectional view of an illumination apparatus showing how an optical structure manipulates light that it receives in a structure comprising no passive optical nanostructures.

FIG. 3B illustrates a cross-sectional view of the illumination apparatus showing how an optical structure manipulates light that it receives in a structure comprising no passive optical nanostructures. Features of the embodiment of FIG. 3B not discussed in further detail may be assumed to correspond to the features with equivalent reference numerals as discussed above, including any potential variations in the features.

In comparison to the arrangement of FIG. 3A, the passive optical nanostructure 130 and adhesive layer 206 is omitted and an air gap 207 is provided between the light emitting element 110 and optical substrate 220. Supporting members 208 such as adhesive points may be provided to achieve alignment between the substrate 200 and optical structure 220 and to increase mechanical and thermal stability. The supporting members 208 may be provided in regions between the light emitting elements so are not visible to an external observer and do not provide undesirable light loss.

As for FIG. 3A, light rays 180 from the light emitting element 110 are confined in the optical structure 220 to within the critical angle θc so that light does not propagate between adjacent curved reflector 222B from a light emitting element 110 aligned with curved reflector 220A. Advantageously cross talk and stray light is minimised.

The structure and operation of the passive optical nanostructure 130 of FIG. 3A will now be further described.

Figure 4:
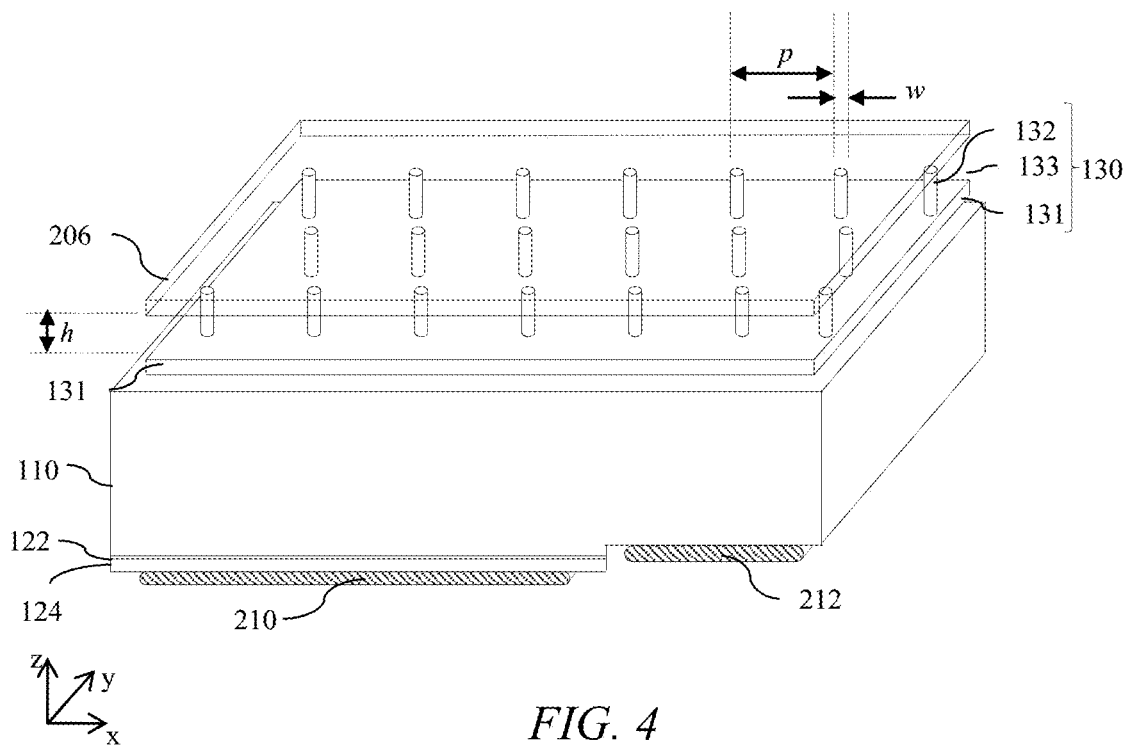
FIG. 4 illustrates a perspective view of a type of passive optical nanostructure arranged on a light emitting element.

FIG. 4 illustrates a perspective view of a type of passive optical nanostructure 130 that may be mounted on the light emitting elements 110. Features of the embodiment of FIG. 4 not discussed in further detail may be assumed to correspond to the features with equivalent reference numerals as discussed above, including any potential variations in the features.

The passive optical nanostructure 130 comprises a base layer 131, a plurality of spacers 132, and an air gap 133. In this embodiment, the plurality of spacers 132 are pillars or columns. The plurality of spacers 132 extend perpendicularly from the base layer 132. The plurality of spacers 132 are uniformly distributed on the base layer 131 such that the distance p between adjacent spacers 132 (also known as the pitch of the spacers 132) is substantially the same for each pair of adjacent spacers 132. Each of the plurality of spacers 132 has substantially the same height h as each of the other spacers 132. The air gap 133 is defined by the spacers 132 and the base layer 131. More specifically, the air gap 133 comprises air which fills the space between the spacers 132 from the base layer 131 up to the height of the spacers 132.

The spacers 132 each have a height h greater than the wavelength $\lambda$ of the light travelling through the air gap 133, and a width w less than the wavelength $\lambda$ of the light travelling through the air gap 133. The width w is sufficiently small so that the light rays effectively experience the refractive index of the air gap due to the sub-wavelength phase structure of the spacers 132.

Desirable dimensional properties of the passive optical nanostructure 130 for a nominal wavelength of 550 nm will now be described. The spacers 132 each have a height h greater than the wavelength $\lambda$ of the light travelling through the air gap 133. The width w and pitch p of the spacers 132 is arranged to minimise diffractive light scatter from the spacers 132 of the light travelling through the air gap 133, and to minimise guiding of light within the spacers 132.

The pitch p may be less than $2\lambda$, preferably less than $\lambda$, more preferably less than $\lambda/2$ and most preferably less than $\lambda/5$. The ratio w/p may be less than 0.5, and preferably less than 0.3 and more preferably less than 0.1. Such elements may provide high angle diffraction or zero order diffraction. Advantageously diffractive scatter from the spacers and gaps between the spacers may be reduced, minimising light scatter between adjacent curved reflectors 222A, 222B. Such elements may be provided by lithographic fabrication techniques on a monolithic wafer. The elements may be transferred from the monolithic wafer or may be arranged to provide a replication tool as described elsewhere herein.

The passive optical nanostructure 130 has an effective refractive index $n_1$ given by the equation:

$$n_1 = 1 + \frac{w^2}{p^2}(n-1) \qquad \text{eqn. 1}$$

where $n_1$ is the effective refractive index, n is the refractive index of the spacers 132, p is the pitch of the spacers 132 and w is the width of each of the spacers 132. w, p and n have values such that $n_1$ is a value which causes total internal reflection of at least some of the light reaching the passive optical nanostructure 130. The critical angle $\theta_c$ of light within the optical structure 220 is then given by the equation:

$$\theta_c = \sin^{-1}(n_1/n_2) \qquad \text{eqn. 2}$$

where $n_2$ is the refractive index of the material of the optical structure 220.

The base layer 131 is, for example, formed from an inorganic material such as silicon dioxide or may be a polymeric material. The spacers 132 are, for example, formed from a patterned inorganic material such as silicon dioxide or may be a polymeric material.

The adhesive layer 206 bonds the passive optical nanostructure 130 to the optical structure 220. More specifically, the adhesive layer 206 is bonded to the top of the spacers 132 and a bottom surface of the optical structure 220. The adhesive layer 206 may be formed from any appropriate adhesive, for example an optically clear adhesive (OCA) or a pressure sensitive adhesive (PSA).

When this type of passive optical nanostructure is used, in operation, light from the light emitting element 110 reaching the interface between the base layer 131 and the air gap 133 is totally internally reflected if it hits the interface at an angle of incidence greater than the critical angle. Thus, only light which hits the interface at an angle of incidence less than the critical angle passes through the interface. The critical angle $\theta_c$ is set so that substantially all the light output from the passive optical nanostructure 130 is at an angle which means that it will be received and reflected by the curved reflector 222A that is aligned with the light emitting element 110. This prevents light emitted by a light emitting element 110 from reaching a curved reflector 222A which is not aligned with the light emitting element 110. This is due to the passive optical nanostructure 130 on each light emitting element 110 totally internally reflecting light which is emitted at wide angles from the top of its respective light emitting element 110.

It may be desirable to provide an illumination apparatus with switchable angular luminance profiles.

Figure 5:
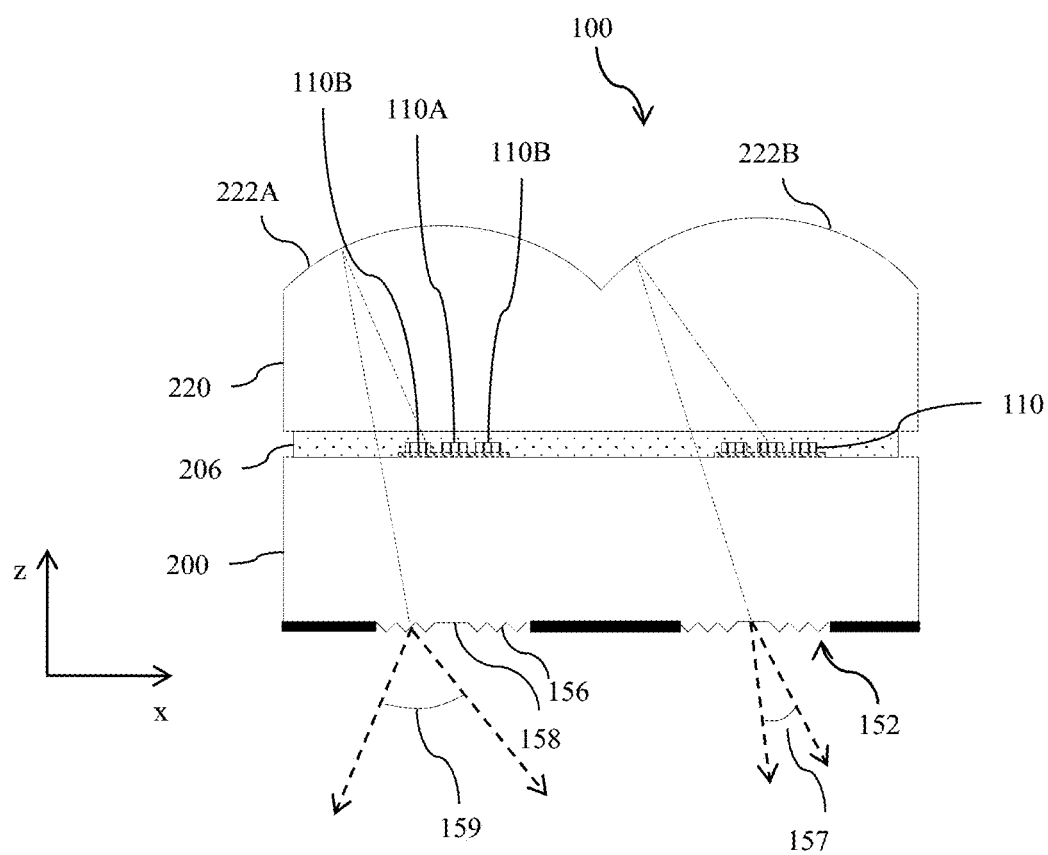
FIG. 5 illustrates a cross-sectional view of a further embodiment of the illumination apparatus.

FIG. 5 illustrates a cross-sectional view of a further embodiment of the illumination apparatus 100. Features of the embodiment of FIG. 5 not discussed in further detail may be assumed to correspond to the features with equivalent reference numerals as discussed above, including any potential variations in the features.

In this embodiment, each light emitting element 110 comprises a central circular light source 110A and an annular light source 110B around the central circular light source 110A. Also, in this embodiment, the apertures 152 in the output mask 150 each comprise an annular diffuser 156 around a clear central hole 158. In this embodiment, the optical structure 220 is configured to direct the light received from the central circular light source 110A substantially only to the clear central hole 158, and to direct light received from the annular light source 110B substantially only to the annular diffuser 156.

The central circular light source 110A and annular light source 110B of each light emitting element 110 are each individually controllable, i.e. one may be controlled to be on while the other is controlled to be off and vice versa. When only the central circular light source 110A of a light emitting element 110 is on, the light output from the aperture 152 aligned with that light emitting element 110 has a first (relatively narrow) cone angle 157. When only the annular light source 110B of the light emitting element 110 is on, the light output from the aperture 152 aligned with that light emitting element 110 has a second (relatively wide) cone angle 159 which is higher than the first cone angle 157, due to the light being scattered by the annular diffuser 156. The illumination apparatus 100 is operable in a first state in which only the central light sources 110A of its array of light emitting elements 110 are on and a second state in which only the annular light sources 110B of its array of light emitting elements 110 are on.

When the illumination apparatus is provided as a display the first state may be said to correspond to a privacy mode, since the overall light output by the illumination apparatus in this state has a relatively narrow cone angle and the display has low image visibility for off-axis snoopers. The second state may be said to correspond to a share mode of operation, since the overall light output by the illumination apparatus in this state has a relatively wide cone angle and the displayed image has high image visibility for off-axis users.

Figure 6:
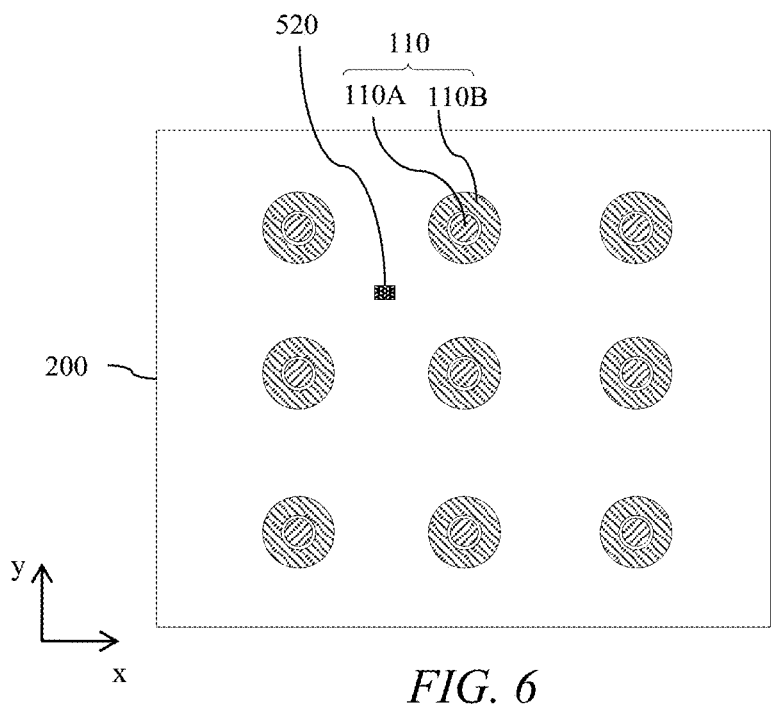
FIG. 6 illustrates a plan view of light emitting elements according to the embodiment of FIG. 5 described above.

The illumination apparatus 100 comprises a controller (not shown) configured to perform the control described above. As a result of this functionality, the illumination apparatus 100 may be used to provide the lighting in a privacy display FIG. 6 illustrates a plan view of the light emitting elements according to the embodiment of FIG. 5 described above. Substrate 200 comprises an array of light emitting elements 110 with central light sources 110A and annular light sources 110B. Electronics 520 may be arranged between the light sources in regions in which rays 180 that have been reflected by the curved reflectors 222A, 222B are not incident.

Figure 7:
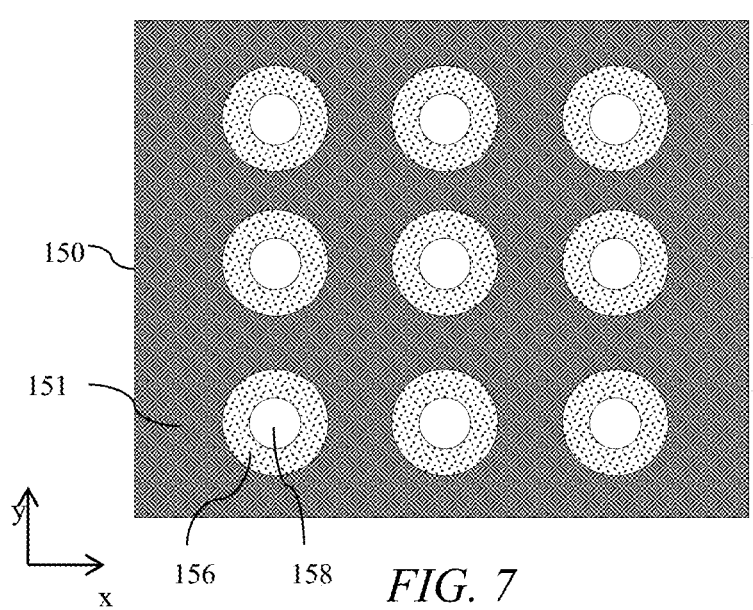
FIG. 7 shows a plan view of a mask according to the embodiment of FIG. 5 described above.
Figure 8:
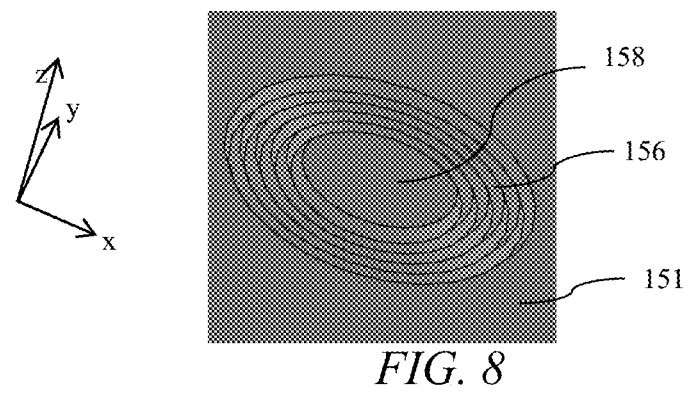
FIG. 8 illustrates a perspective close-up view of the structure of an annular diffuser.

FIG. 7 shows a plan view of the output mask 150 according to the embodiment of FIG. 5 described above; and FIG. 8 illustrates a perspective close-up view of the structure of one of the annular diffusers 156. As shown, the annular diffuser 156 comprises a plurality of concentric ridges which act to scatter light which passes through the annular diffuser 156. Annular diffuser 156 around a clear central hole 158 are illustrated, with opaque regions 151 arranged between respective annular diffusers 156. In operation light from central light sources 110A is directed to clear central holes 158 and light from annular light sources 110B is directed to annular diffuser 156. Advantageously a switchable privacy display may be provided.

Figure 9A:
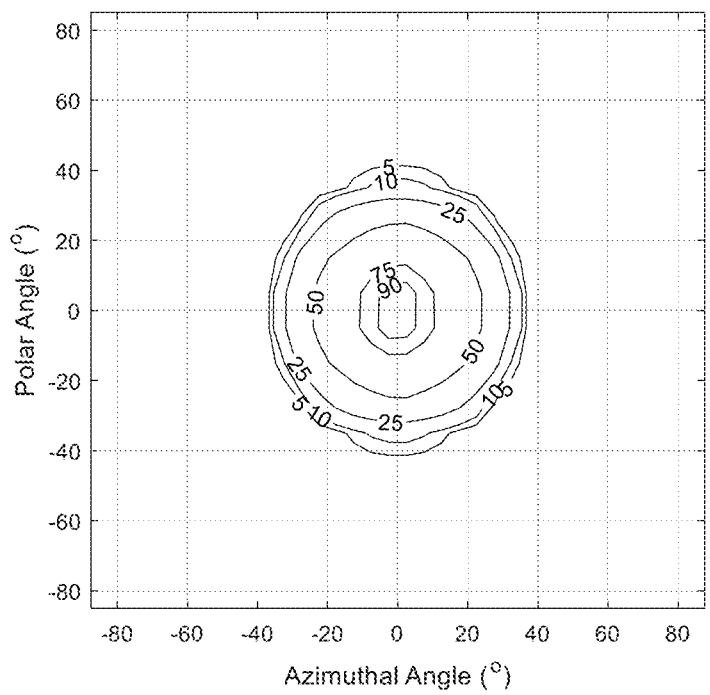
FIG. 9A and FIG. 9B illustrate graphs showing the cone angles of the light output from the apertures.
Figure 9B:
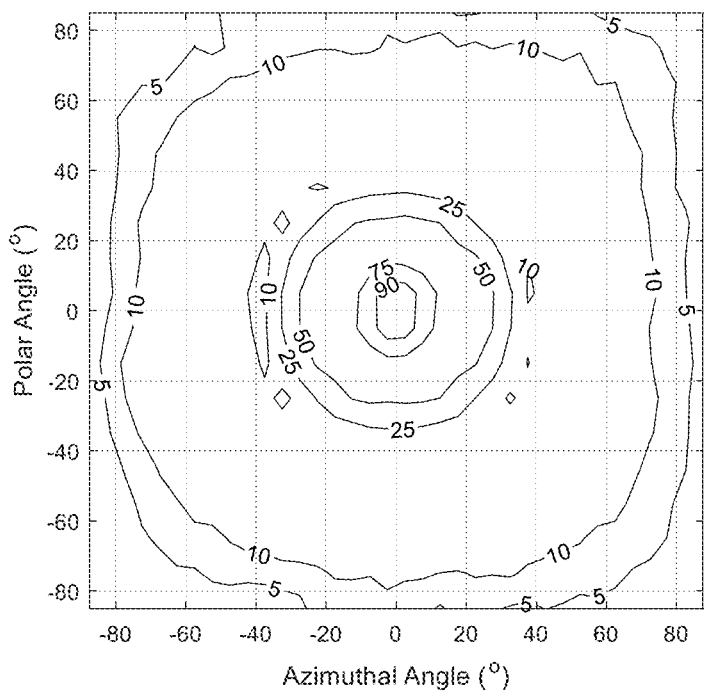

FIG. 9A and FIG. 9B illustrate graphs showing the cone angles of the light output from each of the apertures 152 in the first and second states described above with reference to FIG. 5. FIG. 9A illustrates the relatively narrow first cone angle of the light output by the aperture 152 in the first state, for example for use in a privacy mode of operation of a privacy display. FIG. 9B illustrates the relatively wide second cone angle of the light output by each of the apertures 152 in the second state, for example for use in a share mode of operation of a switchable privacy display. The numbered contours in these graphs each represent points in the x-y plane with the same relative luminance, i.e. the relative luminance value indicated on the contour.

A privacy display may be provided advantageously with low luminance to off-axis snoopers. A switchable privacy display may be provided with a high share mode luminance to off-axis users.

It may be desirable to provide a tiled display with low visibility of seams between the tiles.

Figure 10:
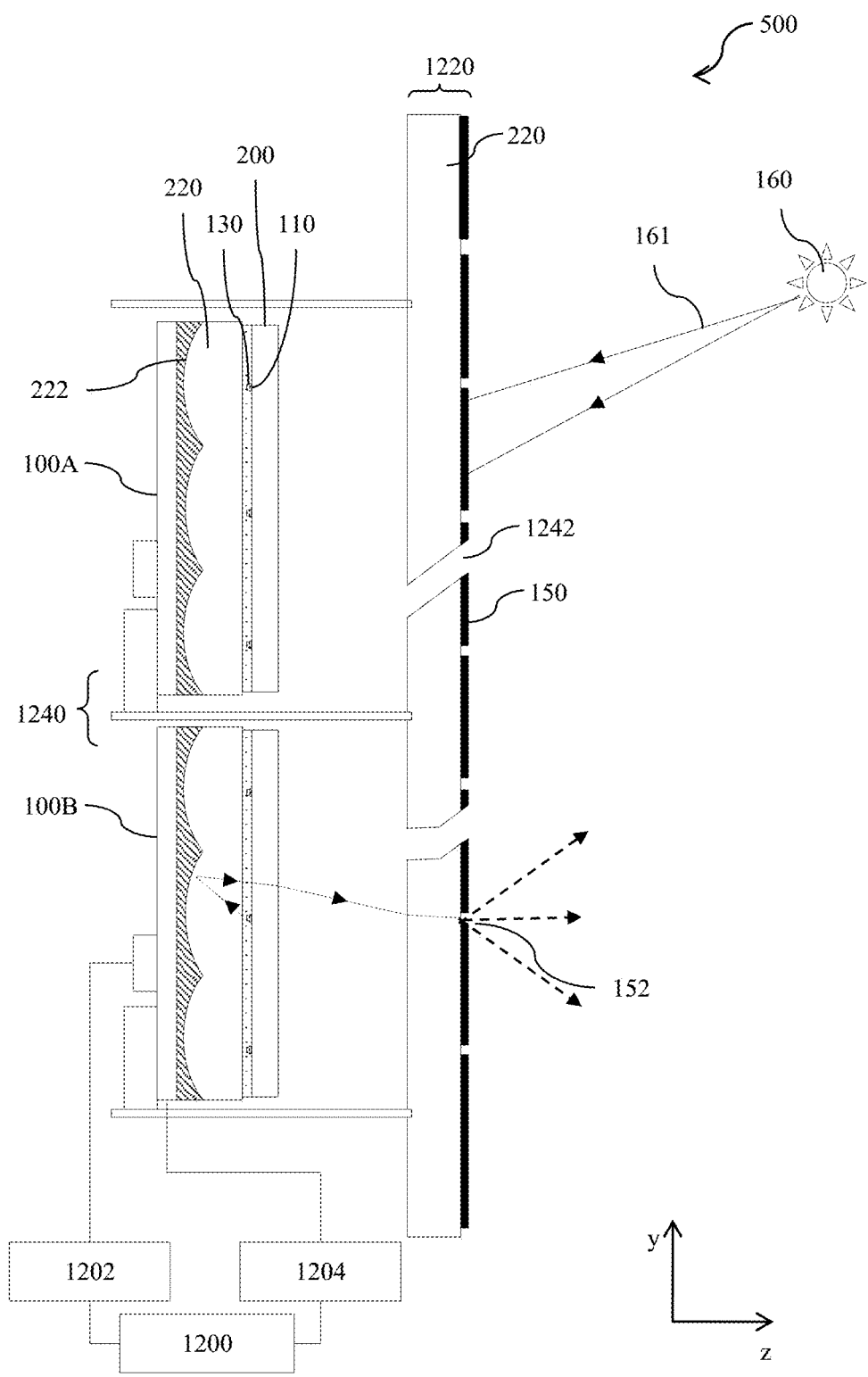
FIG. 10 illustrates a cross-sectional view of an embodiment of a tiled display apparatus comprising the illumination apparatus of the embodiment of FIG. 1.

FIG. 10 illustrates a cross-sectional view of an embodiment of a tiled display apparatus 500 comprising the illumination apparatus 100 of the embodiment of FIG. 1. The tiled display apparatus 500 may be, for example, a television. Features of the embodiment of FIG. 10 not discussed in further detail may be assumed to correspond to the features with equivalent reference numerals as discussed above, including any potential variations in the features.

The display apparatus 500 comprises a screen 1220 and controller 1200 configured to control various functions of the display apparatus 500, e.g. an audio controller 1202 and a display controller 1204.

In this embodiment, the illumination apparatuses are tiled such that there are a plurality of separately controllable tiles 100A, 100B, each tile 100A, 100B comprising its own group of components of the illumination apparatus 100. In this embodiment, the output mask 150 is part of the screen 1220, and the screen 1220 is positioned such that each aperture 152 of the output mask 150 is aligned with a respective light emitting element 110.

In comparison to the arrangement of FIG. 1, large display area may be achieved at low cost. Seam regions 1240 between the tiles 100A, 100B are not visible in ambient illumination 161 from ambient light sources 160 and are advantageously hidden to external observers. Acoustic apertures 1242 may be provided to advantageously achieve propagation of sound through the screen 1220 across the area of the display apparatus 500. Localised sound may advantageously be achieved, for example for use in a cinema.

It may be desirable to provide a high contrast illumination apparatus comprising an opaque support substrate.

Figure 11:
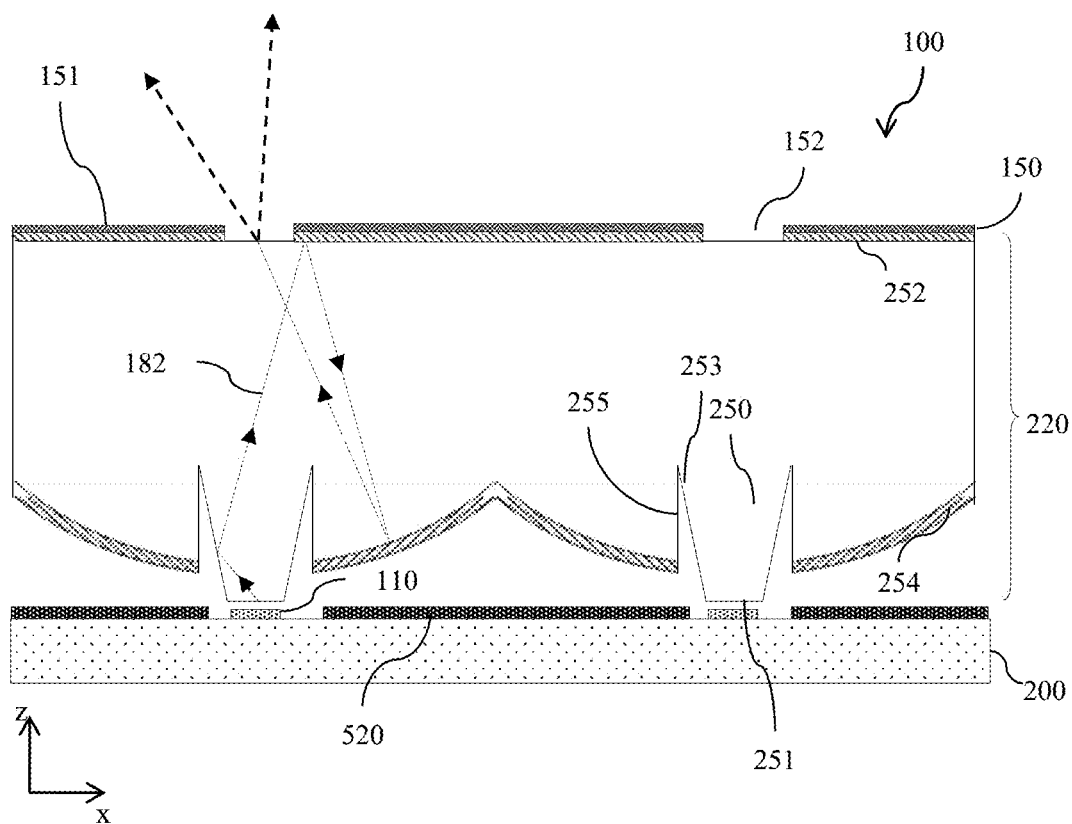
FIG. 11 illustrates a cross-sectional view of a further embodiment of the illumination apparatus.

FIG. 11 illustrates a cross-sectional view of a further embodiment of the illumination apparatus 100. Features of the embodiment of FIG. 11 not discussed in further detail may be assumed to correspond to the features with equivalent reference numerals as discussed above, including any potential variations in the features.

In this embodiment, the optical structure 220 is disposed between the array of light emitting elements 110 and the output mask 150. In operation, the optical structure 220 is configured to receive light rays 182 emitted by the array of light emitting elements 110, direct the received light into a direction away from the substrate 200, direct at least some of the light which has been directed away from the substrate 200 back towards the substrate 200, and direct at least some of the light which has been directed back towards the substrate 200 through the plurality of apertures 152 of the output mask 150. The optical structure 220 further comprises a waveguide 250.

In comparison to the above embodiments, in this embodiment, the light output from the apertures 152 does not pass through the substrate 200. Accordingly, in this embodiment, the substrate 200 is an opaque substrate. Increased density of electronics 520 may be advantageously provided in comparison to the embodiments above without attenuating the light output. Increased complexity of the driving architecture of the light emitting elements 110 may be provided and higher resolution may be achieved over large substrate areas.

In this embodiment, the optical structure 220 is a catadioptric optical structure that operates by means of refraction and reflection. Light emitting elements 110 are arranged in air and refraction at interface 251 to waveguide 250 provides guiding light rays 182 by total internal reflection within the waveguide 250.

Specifically, the optical structure 220 comprises a plurality of waveguides 250 configured to guide light rays 182 emitted by the light emitting elements 110 towards the output mask 150. The optical structure 220 comprises the first reflector 252 that is configured to reflect at least some of the light guided by the waveguides 250 towards the first substrate 200. The optical structure 220 further comprises a second reflector 254 configured to reflect at least some of the light rays 182 reflected by the first reflector 252 back towards the apertures 152 of the output mask 150 that is provided in alignment with the first reflector 252 of the optical structure 220.

Each waveguide 250 comprises a conical frustrum (or frustroconical) structure 251, 253 and an annular wall 255 extending around the conical frustum structure 251, 253 although any shape and material which achieves the above function would be appropriate. For each waveguide 250 the conical frustum structure 251, 253 is connected to the second reflector 254 via the annular wall 255. The conical frustum structure 251, 253 comprises an open end and a closed end opposite to (or facing) the open end. The open end corresponds to the larger circle of the conical frustum shape and the closed end corresponds to the smaller circle of the conical frustum shape. The open and closed ends are connected by a frustroconical wall extending between the open and closed ends. The open end corresponds to the top of the frustroconical structure and the closed end corresponds to the bottom of the frustroconical structure. The top of the conical frustum structure 250 is connected to the annular wall 255 at the top of the annular wall 255, and the second reflector 254 is connected to the annular wall 255 at the bottom of the annular wall 255.

Each waveguide 250 is aligned with a respective light emitting element 110. The optical structure may be provided in a polymer material formed by moulding for example.

In this embodiment, each aperture 152 of the output mask 150 is circular, for example as illustrated in FIG. 2. In other embodiments (not shown) the aperture 152 shape may not be circular, such as rectangular to efficiently couple light from the light emitting elements 110 that may also be rectangular.

Each aperture 152 is aligned with a respective light emitting element 110. The first reflector 252 is disposed between the output mask 150 and the second reflector 254, and comprises circular apertures aligned with the circular apertures 152 of the output mask 150. The first reflector 252 has the same shape and is aligned with the opaque mask 151, which may be a black material as described herein.

In this embodiment, the second reflector 254 comprises a plurality of curved reflecting elements. Each curved reflecting element is disposed between two adjacent waveguides 250 in the x direction. Each waveguide 250 is disposed between two adjacent curved reflecting elements in the x direction.

In operation, in sequence, a light ray 182 emitted by a light emitting element 110 is refracted into the respective waveguide 250 aligned with the light emitting element 110, is guided by the waveguide (by a combination of refraction when entering the waveguide and reflection on an internal face of the waveguide) towards the output mask 150, is reflected by the first reflector 252 back towards the substrate 200, is reflected by the second reflector 254 back towards the mask 150 again, and travels through an aperture 152 in the output mask 150.

Another structure for an opaque substrate will now be described.

Figure 12A:
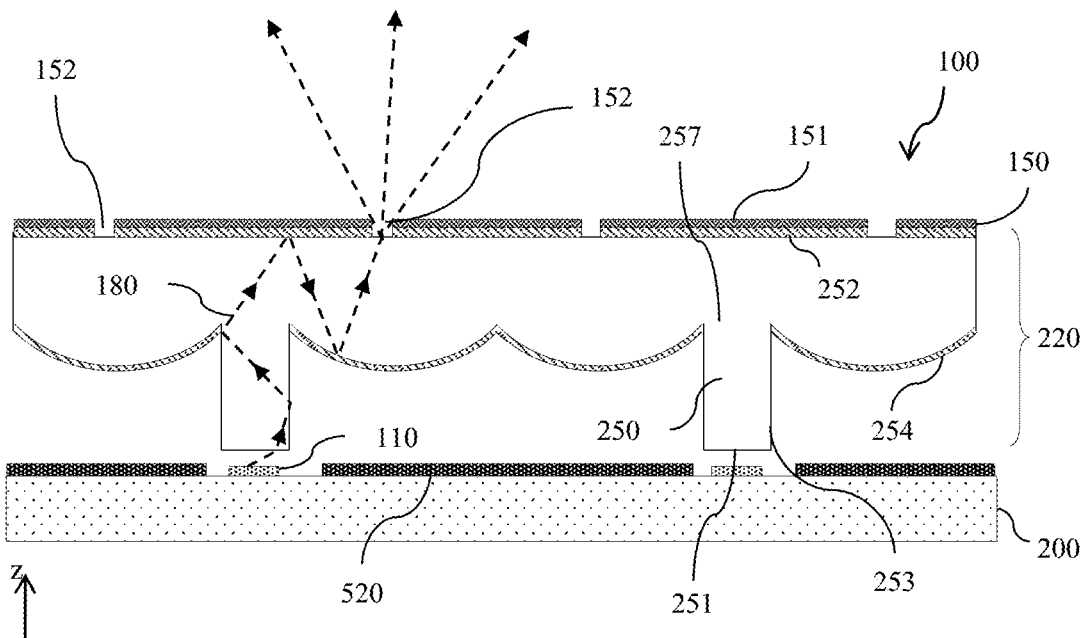
FIG. 12A illustrates a cross-sectional view of a further embodiment of the illumination apparatus.

FIG. 12A illustrates a cross-sectional view of a further embodiment of the illumination apparatus 100. Features of the embodiment of FIG. 12A not discussed in further detail may be assumed to correspond to the features with equivalent reference numerals as discussed above, including any potential variations in the features.

In this embodiment, the optical structure 220 is disposed between the array of light emitting elements 110 and the output mask 150. In operation, the optical structure 220 is configured to receive light rays 180 emitted by the array of light emitting elements 110, direct the received light into a direction away from the substrate 200, direct at least some of the light which has been directed away from the substrate 200 back towards the substrate 200, and direct at least some of the light which has been directed back towards the substrate 200 through the plurality of apertures 152 of the output mask 150.

As with FIG. 11, in this embodiment, the light output from the apertures 152 does not pass through the substrate 200. Accordingly, in this embodiment, the substrate 200 is an opaque substrate. As with FIG. 11, increased density of electronics 520 may be advantageously be provided without attenuating the light output in comparison to the other embodiments above. Increased complexity of the driving architecture of the light emitting elements 110 may be provided and higher resolution may be achieved over large substrate areas.

In this embodiment, the optical structure 220 is a catadioptric optical structure that operates by means of refraction and reflection. Light emitting element 110 is arranged in air and refraction at interface 251 to waveguide 250 provides guiding light rays 180 by total internal reflection within the waveguide 250.

Specifically, the optical structure 220 comprises a plurality of waveguides 250 configured to guide light rays 180 emitted by the light emitting elements 110 towards the output mask 150. The optical structure 220 comprises the first reflector 252 that is configured to reflect at least some of the light guided by the waveguides 250 towards the first substrate 200. The optical structure 220 further comprises a second reflector 254 configured to reflect at least some of the light reflected by the first reflector 252 back towards the apertures 152 of the output mask 150 that is provided in alignment with the first reflector 252 of the optical structure 220.

Each waveguide 250 is aligned with a respective light emitting element 110.

In this embodiment, each waveguide 250 comprises a cylindrical structure, although any shape and material which achieves the above function would be appropriate.

For each waveguide 250: the cylindrical structure comprises an open end 257 and a closed end 251 opposite to (or facing) the open end 257. The open and closed ends 257, 251 are connected by a cylindrical wall 253 extending in the z direction between the open and closed ends 257, 251.

The cylindrical structure is connected to the second reflector 254 at the open end 257. The open end 257 corresponds to the top of the cylindrical structure and the closed end 251 corresponds to the bottom of the cylindrical structure.

The optical structure may be provided in a polymer material formed by moulding for example.

In this embodiment, each aperture 152 of the output mask 150 is annular and aligned with a respective light emitting element 110. The first reflector 252 is disposed between the output mask 150 and the second reflector 254, and comprises annular apertures aligned with the annular apertures 152 of the output mask 150. The first reflector 252 has the same shape and is aligned with the opaque mask 151 which may be a black material as described herein.

In this embodiment, the second reflector 254 comprises a plurality of curved reflecting elements. Each curved reflecting element is disposed between two adjacent waveguides 250 in the x direction, and extends in the x direction substantially in line with the tops of the waveguides 250. Each waveguide 250 is disposed between two adjacent curved reflecting elements in the x direction.

In operation, in sequence, a light ray 180 emitted by a light emitting element 110 is refracted into the respective waveguide 250 aligned with the light emitting element 110, is guided by the waveguide (by a combination of refraction when entering the waveguide and reflection on an internal face of the waveguide) towards the output mask 150, is reflected by the first reflector 252 back towards the substrate 200, is reflected by the second reflector 254 back towards the mask 150 again, and travels through an aperture 152 in the output mask 150.

Figure 12B:
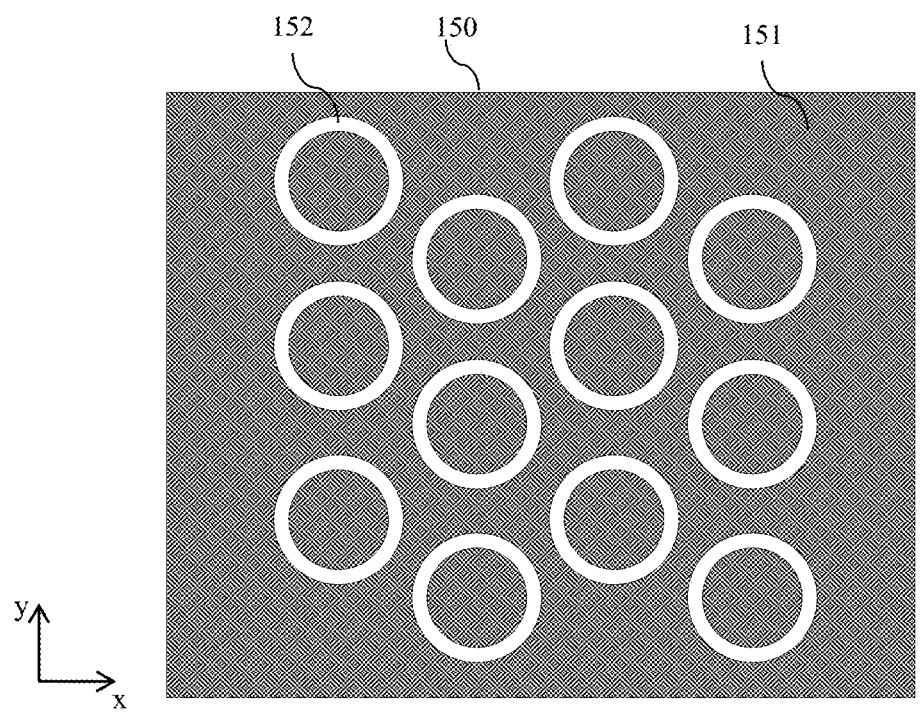
FIG. 12B illustrates a plan view of a mask of the embodiment of FIG. 12A.

FIG. 12B illustrates a plan view of the output mask 150 of the embodiment of FIG. 12A. In this embodiment the apertures 152 are annular. The first reflector 252 and mask 150 may be formed on the optical structure 220 for example by lithography or printing. Advantageously low reflectivity may be provided in ambient illumination. Contrast of a display apparatus may be increased and power consumption may be reduced for a desirable contrast when the display is operated in high ambient illuminance.

Arrangements of masks 150 will now be further described.

Figure 13:
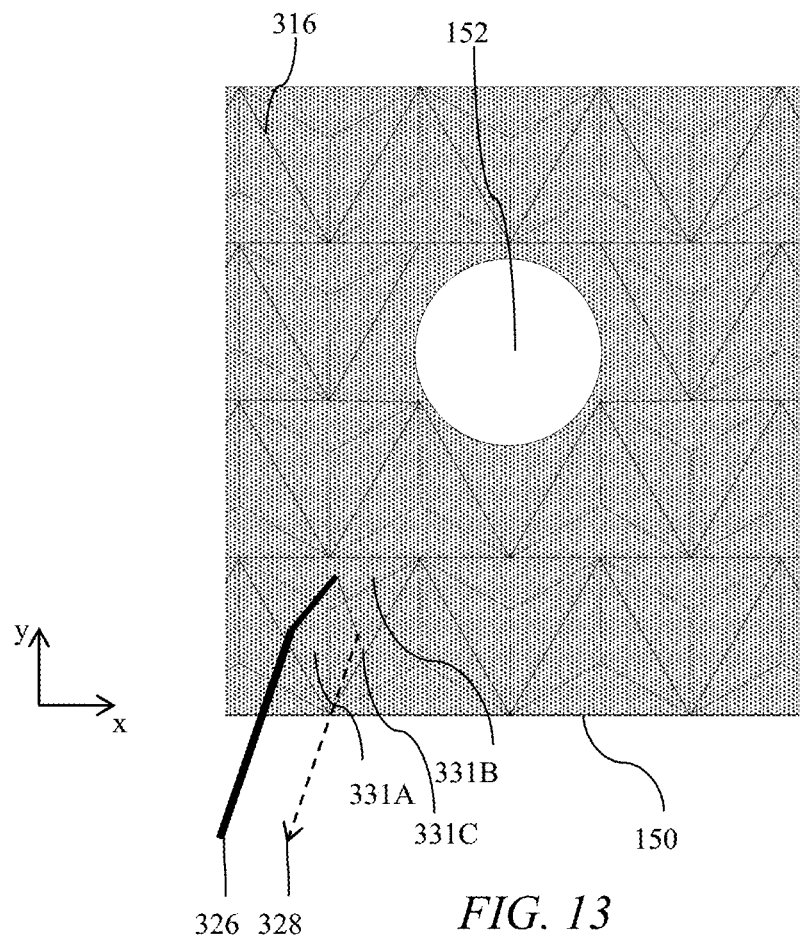
FIG. 13 illustrates a plan view of an embodiment of a mask of the illumination apparatus.

FIG. 13 illustrates a plan view of an embodiment of the output mask 150 described above. The output mask 150 has a light absorbing structure 316 that comprises a corner cube retro-absorber microstructure. Light absorbing structure 316 has a dark or black surface that may be physically shaped such as a plurality of corner cube absorbers each comprising facet surface 331A, 331B, 331C. In operation ambient light rays 326 are incident on the facet surfaces 331A, 331B, 331C of the corner cube absorber. At each surface reflection, light is absorbed and scattered such that the overall luminance of light rays 328 is substantially reduced in comparison to a planar black surface. The light absorbing structure 316 may comprise a surface relief comb structure with high surface area for absorption of incident radiation. Advantageously front of screen reflections are reduced and image contrast enhanced or power consumption reduced for a desirable achieved contrast ratio. Further, known microstructured surface tooling and replication methods can be provided to form the structure of the corner cubes or other micro-structured surface to achieve low cost and high uniformity. The feature size of the micro-structure may be less than the pitch of the aperture 152. For example, the pitch of the apertures 152 may be 300 micrometres and the microstructure may have a pitch of 100 micrometres. The features of the micro-structure may be arranged to minimise diffractive spreading of reflected light rays 328, for example by minimising the number of narrow features of less than 20 micrometres size at the cusps of the microstructure. Advantageously a very high contrast display is produced which is not affected by high levels of ambient lighting. The light absorbing structure 316 may be used indoors, where the black material and shape of light absorbing structure 316 help attenuate reflections from light reflected off the faces and clothing of the one or many observers, which would otherwise reduce the perceived contrast of the displayed images, for example when the ambient illumination is absent or very low. The light absorbing structure 316 may further be coated with Teflon or other similar material which resists staining or wetting and is resistant to degradation by dust and/or liquids.

Figure 14:
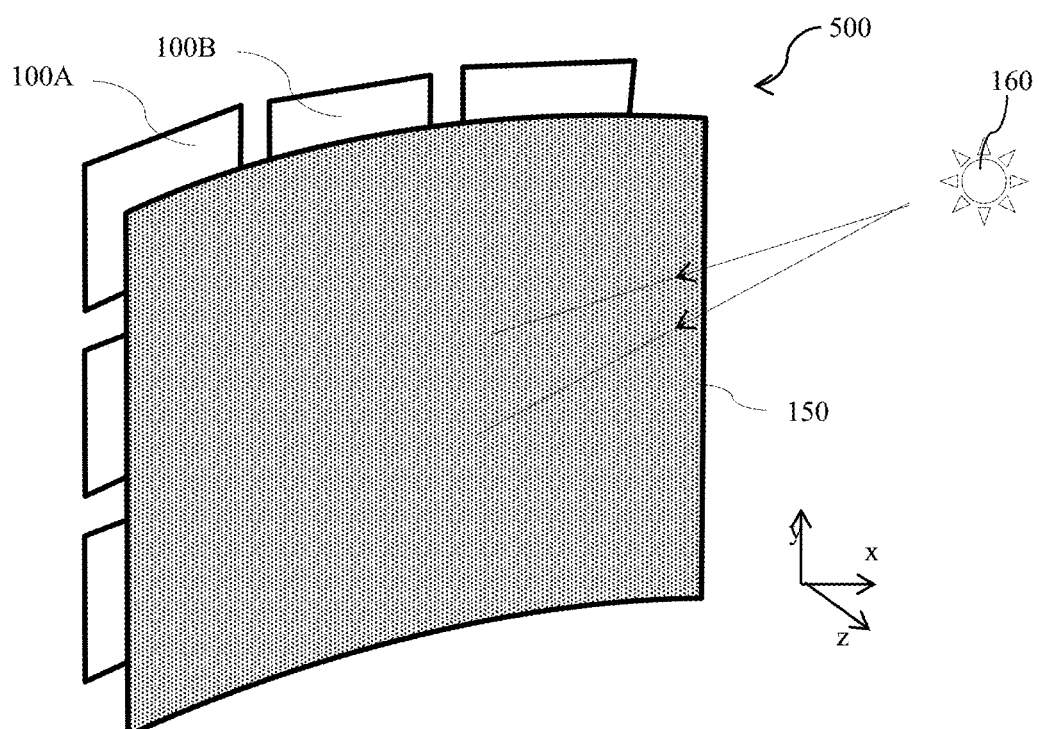
FIG. 14 illustrates a perspective view of the mask and tiling of the display apparatuses of FIG. 10.

FIG. 14 illustrates a perspective view of the output mask 150 and tiling of the display apparatus 100A, 100B of FIG. 10. Advantageously a tiled display with high contrast in ambient illumination may be provided. The seams between the tiles may be invisible to display users. Very large area displays which may be tiled may be provided.

Figure 15:
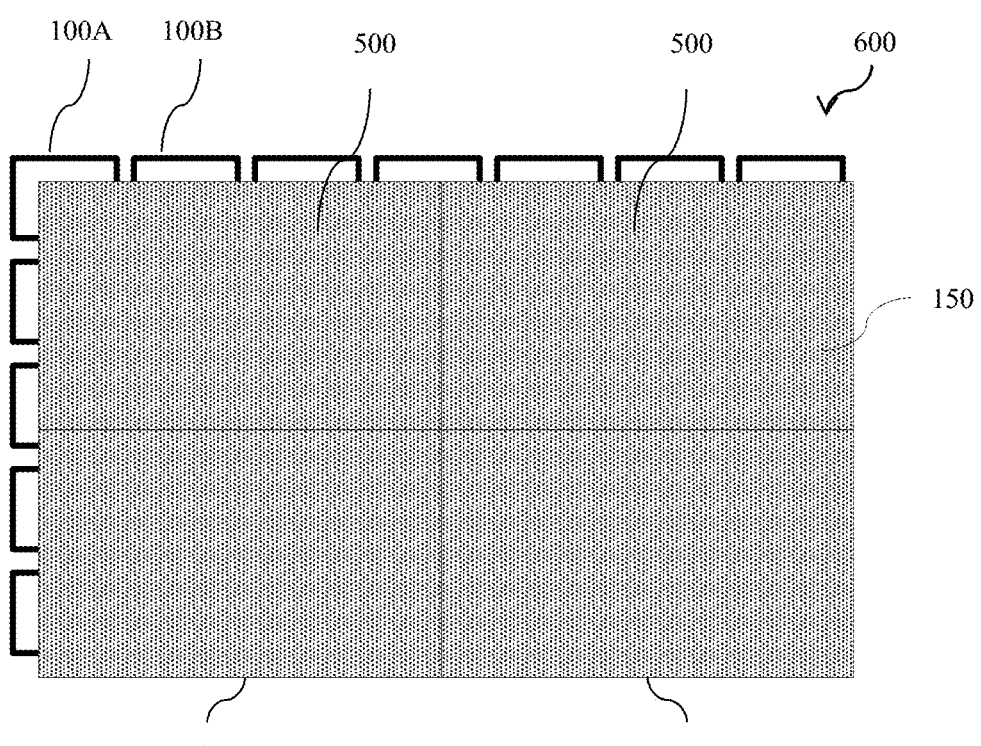
FIG. 15 illustrates a composite display apparatus comprising a plurality of the display apparatuses.

FIG. 15 illustrates a composite display apparatus 600 comprising a plurality of the display apparatuses 500 according to the embodiment of FIG. 10 tiled together to create a larger display. Advantageously a tiled display with high contrast in ambient illumination may be provided. A very small number of seams may be provided so that seam visibility may be low. Extremely large area displays which may be tiled may be provided, for example for stadium or cinema displays with low power consumption while achieving desirable image contrast.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent. Furthermore, in this specification, the term "annular" encompasses both circular and elliptical annular shapes.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An illumination apparatus, comprising:
   a first substrate;
   an optical structure;
   an array of light emitting elements disposed on the first substrate and between the first substrate and the optical structure; and
   a mask comprising a plurality of apertures therein, wherein each aperture is aligned with a respective light emitting element, and
   wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask.

2. The illumination apparatus of claim 1, wherein the optical structure comprises a plurality of curved reflectors configured to reflect at least some of the light emitted by the light emitting elements back past the light emitting elements towards the mask.

3. The illumination apparatus of claim 1, wherein the array of light emitting elements is disposed between the optical structure and the mask.

4. A display apparatus comprising the illumination apparatus of claim 1.

5. The display apparatus of claim 4, wherein the display apparatus is a privacy display apparatus.

6. The illumination apparatus of claim 1, wherein at least one of the light emitting elements comprises a first light source and a separate second light source, wherein the first and second light sources are separately controllable.

7. The illumination apparatus of claim 6, further comprising a controller configured to control the first and second light sources to switch between a first state in which the first light source is on and the second light source is off, and a second state in which the first light source is off and the second light source is on.

8. The illumination apparatus of claim 1, wherein the light emitting elements are micro-LEDs.

9. The illumination apparatus of claim 1, wherein one or more of the apertures of the mask are annular.

10. The illumination apparatus of claim 1, wherein one or more of the apertures of the mask comprise a light diffuser disposed therein.

11. The illumination apparatus of claim 1, wherein one or more of the apertures of the mask are circular.

12. An illumination apparatus, comprising:
a first substrate;
an optical structure;
an array of light emitting elements disposed on the first substrate and between the first substrate and the optical structure, wherein at least one of the light emitting elements comprises a first light source and a separate second light source, wherein the first and second light sources are separately controllable, wherein the first light source is configured to provide light with a first cone angle and the second light source is configured to provide light with a second cone angle, and wherein the first cone angle is greater than the second cone angle; and
a mask comprising a plurality of apertures therein,
wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask.

13. The illumination apparatus of claim 12, wherein each aperture is aligned with a respective light emitting element.

14. The illumination apparatus of claim 12, wherein the optical structure comprises:
a plurality of waveguides configured to guide light emitted by the light emitting elements towards the mask;
a first reflector configured to reflect at least some of the light guided by the waveguides towards the first substrate; and
a second reflector configured to reflect at least some of the light reflected by the first reflector back towards the mask.

15. An illumination apparatus, comprising:
a first substrate;
an optical structure;
an array of light emitting elements disposed on the first substrate and between the first substrate and the optical structure; and
a mask comprising a plurality of apertures therein,
wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask, and
wherein the optical structure comprises:
a plurality of waveguides configured to guide light emitted by the light emitting elements towards the mask;
a first reflector configured to reflect at least some of the light guided by the waveguides towards the first substrate; and
a second reflector configured to reflect at least some of the light reflected by the first reflector back towards the mask, and
wherein each waveguide comprises a cylindrical structure, and
for each waveguide:
the cylindrical structure comprises an open end and a closed end opposite to the open end, and the cylindrical structure is connected to the second reflector at the open end.

16. The illumination apparatus of claim 15, wherein each waveguide is aligned with a respective light emitting element.

17. The illumination apparatus of claim 15, wherein the optical structure is disposed between the array of light emitting elements and the mask.

18. An illumination apparatus, comprising:
a first substrate;
an optical structure;
an array of light emitting elements disposed on the first substrate and between the first substrate and the optical structure; and
a mask comprising a plurality of apertures therein,
wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask, and
wherein the optical structure comprises:
a plurality of waveguides configured to guide light emitted by the light emitting elements towards the mask;
a first reflector configured to reflect at least some of the light guided by the waveguides towards the first substrate; and
a second reflector configured to reflect at least some of the light reflected by the first reflector back towards the mask, and
wherein each waveguide comprises a conical frustrum structure and an annular wall extending around the conical frustrum structure, and
for each waveguide:
the conical frustrum structure is connected to the second reflector via the annular wall.

19. The illumination apparatus of claim 18, wherein each waveguide is aligned with a respective light emitting element.

20. The illumination apparatus of claim 18, wherein the optical structure is disposed between the array of light emitting elements and the mask.

21. An illumination apparatus, comprising:
- a first substrate;
- an optical structure;
- an array of light emitting elements disposed on the first substrate and between the first substrate and the optical structure;
- an array of passive optical nanostructures, each passive optical nanostructure being disposed on a respective one of the light emitting elements, and each passive optical nanostructure comprising an air gap disposed between its respective light emitting element and the optical structure; and
- a mask comprising a plurality of apertures therein,
- wherein the optical structure is configured to receive light emitted by the array of light emitting elements, direct the received light into a direction away from the first substrate, direct at least some of the light which has been directed away from the first substrate back towards the first substrate, and direct at least some of the light which has been directed back towards the first substrate through the plurality of apertures of the mask.

22. The illumination apparatus of claim 21, wherein the light emitting elements are micro-LEDs.

23. The illumination apparatus of claim 21, wherein each aperture is aligned with a respective light emitting element.

* * * * *